(12) United States Patent
Hosseini

(10) Patent No.: US 7,463,162 B1
(45) Date of Patent: Dec. 9, 2008

(54) EARTHQUAKE ALARM SYSTEM

(76) Inventor: Jamshid Hosseini, 22425 Ventura Blvd., #189, Woodland Hills, CA (US) 91364

( * ) Notice: Subject to any disclaimer, the term of this patent is extended or adjusted under 35 U.S.C. 154(b) by 263 days.

(21) Appl. No.: 11/084,605

(22) Filed: Mar. 21, 2005

(51) Int. Cl.
*G08B 21/00* (2006.01)

(52) U.S. Cl. ............... 340/690; 340/539.26; 340/691.3; 340/691.4

(58) Field of Classification Search ................. 340/690, 340/539.26, 691.3, 691.4
See application file for complete search history.

(56) References Cited

U.S. PATENT DOCUMENTS

| | | | |
|---|---|---|---|
| 4,300,135 A * | 11/1981 | Korn et al. | 340/690 |
| 4,628,299 A * | 12/1986 | Tate et al. | 340/690 |
| 5,625,348 A * | 4/1997 | Farnsworth et al. | 340/690 |
| 5,910,763 A * | 6/1999 | Flanagan | 340/690 |
| 6,392,538 B1 * | 5/2002 | Shere | 340/539.26 |
| 6,704,659 B1 * | 3/2004 | Lee et al. | 702/15 |
| 7,005,993 B2 * | 2/2006 | Webb et al. | 340/690 |

* cited by examiner

*Primary Examiner*—Thomas J Mullen
(74) *Attorney, Agent, or Firm*—Albert O. Cota

(57) ABSTRACT

An earthquake alarm system (10) that produces an earthquake alert signal (17) that gives a person a few seconds to take cover or to assist others before the earthquake arrives. The system (10) consists of a plurality of earthquake detecting device (12) that when activated by an earthquake, produce a seismic event signal (11). The seismic event signal (11) is applied sequentially to a microcontroller (26), an auto dialer (30), a telephone line receptacle (34), a telephone company (36) and an R.F. transmitter (38) that produces an R.F. signal (23) that is applied via an R.F. antenna (40) into free space. The R.F. signal (23) is applied to and activates a plurality of remotely-located pagers (44). The pagers (44) include a visual and/or an audio alarm that indicates to a person that an earthquake is imminent.

14 Claims, 5 Drawing Sheets

Ⓔ = EPICENTER

[S] = EARTHQUAKE ALARM SYSTEM — ASIC VERSION

△P = PAGER

D = DISTANCE

T = TIME

EARTHQUAKE ALARM SYSTEM

TECHNICAL FIELD

The invention pertains to the general field of earthquake detecting systems, and more particularly to an earthquake alarm system that provides an earthquake alert signal that is received by a local pager a few seconds prior to the earthquake.

BACKGROUND ART

An earthquake, for the purpose of this disclosure, is defined as a sudden motion or trembling in the earth caused by the abrupt release of slowly accumulated strain. An earthquake swarm is a series of minor earthquakes, none of which may be identified as the main shock, occurring in a limited area and time, frequently in the vicinity of a volcano. A tremor is a minor earthquake, especially a foreshock or an aftershock. A foreshock is a tremor that commonly precedes a larger earthquake or main shock by seconds to weeks, and that originates at or near the epicenter of the larger earthquake. An aftershock is an earthquake which follows a larger earthquake or main shock and originates at or near the epicenter of the larger earthquake. Generally, major earthquakes are followed by a large number of aftershocks, decreasing in frequency over time. Such a series of aftershocks may last many days for small earthquakes or even many months for large earthquakes.

Large magnitude earthquakes that cause significant losses of life and property provoke the greatest attention. However, earthquakes of even greater magnitude may occur in relatively isolated areas which are principally of concern to seismologists.

Three parameters are important in assessing an earthquake (1) duration of the earthquake, (2) velocity of the surface movement, and (3) the rate of change of the velocity. In their potential for damage, these three factors are closely related. A very short earthquake of high velocity which has only one or two cycles of ground motion, is less damaging than an earthquake causing similar motion for many cycles. An earthquake with high acceleration but low velocity is less damaging than one causing higher velocities.

Earthquake intensity may be defined as a measure of the effects of an earthquake, notably in terms of people and structures. Earthquake intensity not only will be dependent upon the strength (or magnitude) of the earthquake, but also upon the distance from the epicenter. Intensity also will be markedly affected by local geology, by the numbers and kinds of structures in a given area, as well as the concentration of people within the affected area. Even the time of day may have a large bearing upon the effects, with large numbers of people assembled in factories, schools, offices, etc., during daytime hours.

The Richter scale classifies earthquakes as follows:

| Magnitude | Intensity (Probable Effects) |
| --- | --- |
| 1 | Detectable only by instruments. |
| 2 | Barely perceptible, even near the epicenter. |
| 4.5 | Detectable within 20 miles of epicenter. Possible slight damage within a small area. |
| 6 | Moderately destructive. |
| 7 | A major earthquake. |
| 8 | A great earthquake. |

Attempts have been made in the prior art to try to predict when and where an earthquake is likely to occur. These attempts have generally not been accurate in determining the time and location of an earthquake. The instant invention does not attempt to predict an earthquake but rather relies on the time differential between the time an earthquake occurs at the epicenter of the earthquake and the time it takes for an earthquake shock wave to arrive at a pager located at a finite distance from the earthquake's epicenter.

A search of the prior art did not disclose any literature or patents that read directly on the claims of the instant invention.

DISCLOSURE OF THE INVENTION

The earthquake alarm system is designed to provide an earthquake warning signal prior to the commencement of the earthquake. In its basic design, the earthquake alarm system consists of:

1. At least one earthquake detecting device having means for producing a set of seismic event signals. Each of the seismic event signals corresponds to the magnitude of the detected earthquake.
2. An electronics circuit having means for processing the seismic event signals and producing an R.F. signal that is applied into free space, and
3. A plurality of remotely-located, wireless pagers that are tuned to receive the R.F. signal and to subsequently activate an alarm indicating that an earthquake is imminent.

In view of the above disclosure it is the primary object of the invention to produce an earthquake alarm system that produces an earthquake alert signal that is received by a person having access to a pager. The received earthquake alert signal gives a person a limited time to take cover or to assist others before the earthquake arrives.

In addition to the primary object of the invention it is also an object of the invention to produce an earthquake alarm system that:

- can be designed to operate with various distances from the earthquake epicenter,
- can be designed by utilizing a modified seismometer,
- can be used in urban and suburban locations,
- can detect earthquakes of various magnitudes,
- has a high reliability and is easily maintained, and
- can save lives.

These and other objects and advantages of the present invention will become apparent from the subsequent detailed description of the preferred embodiment and the appended claims taken in conjunction with the accompanying drawings.

BEST MODE FOR CARRYING OUT THE INVENTION

The best mode for carrying out the invention is presented in terms of a preferred embodiment for an earthquake alarm system 10 that is designed to provide a visual and/or audio alarm that is activated prior to the occurrence of an earthquake. Thus, giving a person a limited time to take cover or to assist others before the earthquake arrives.

Figure 1A:
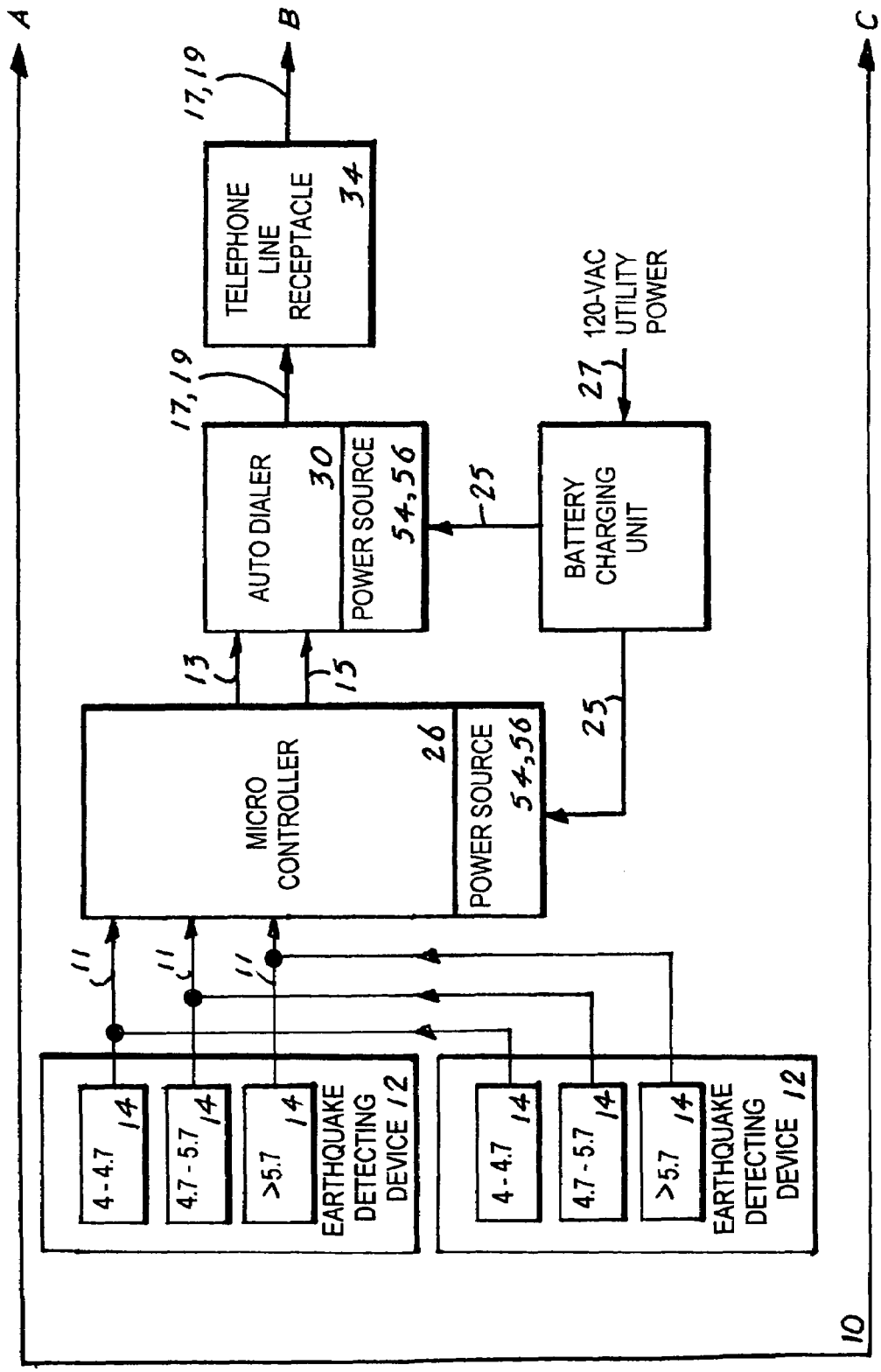
FIGS. 1A and 1B are block diagrams of a first design for a preferred embodiment of the earthquake alarm systems.
Figure 1B:
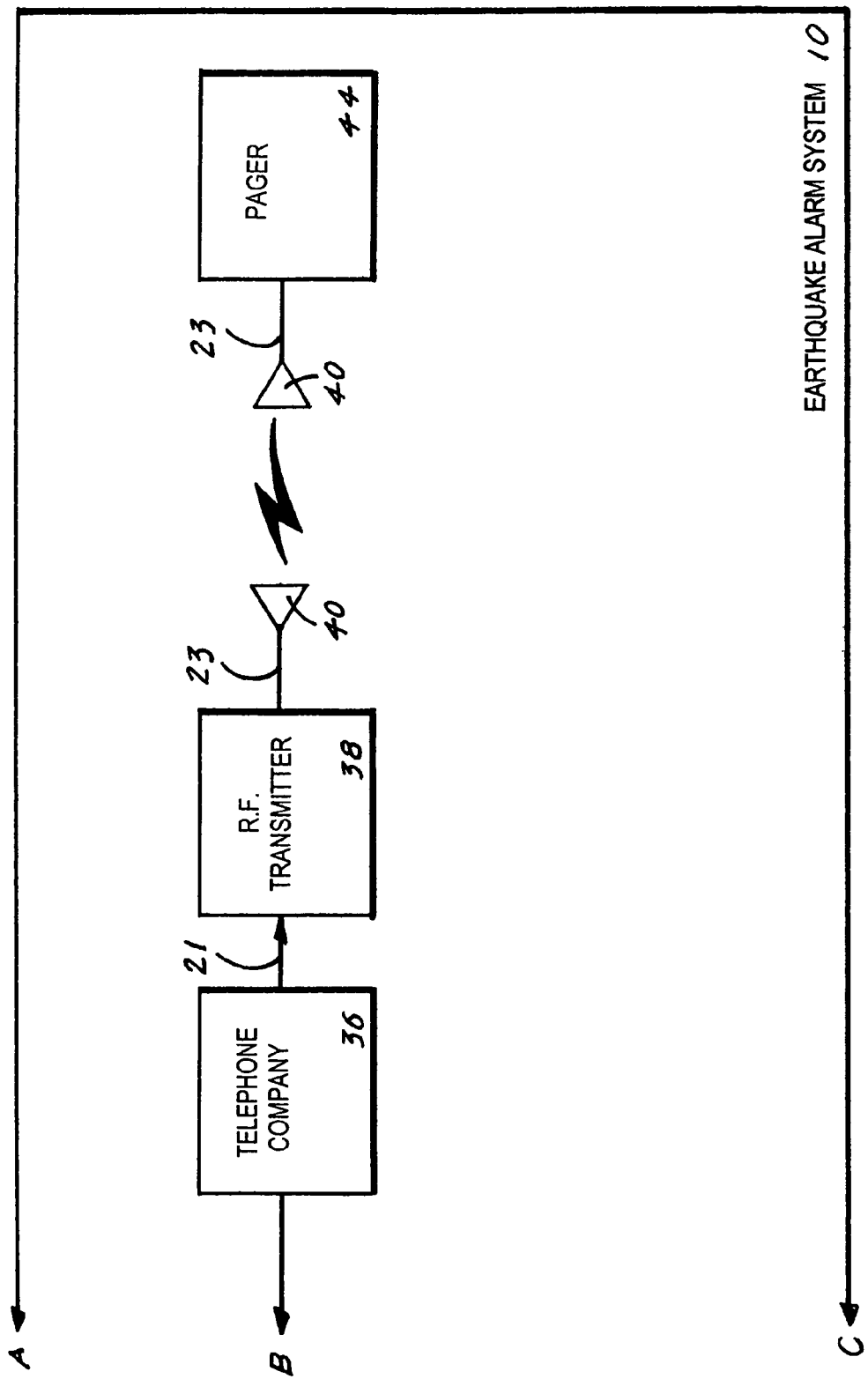
Figure 2A:
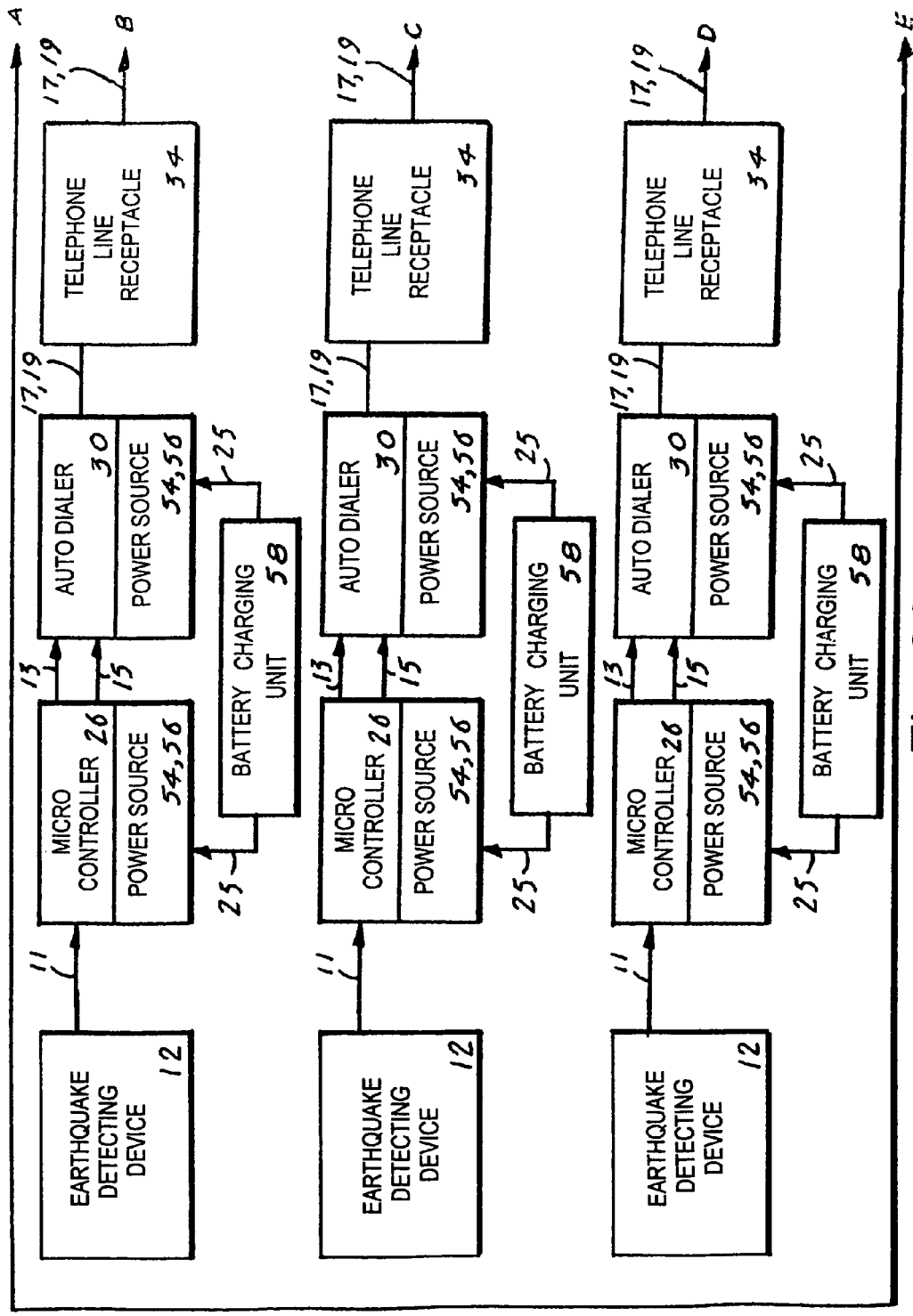
FIGS. 2A and 2B are block diagrams of a second design for the preferred embodiment of the earthquake alarm system.
Figure 2B:
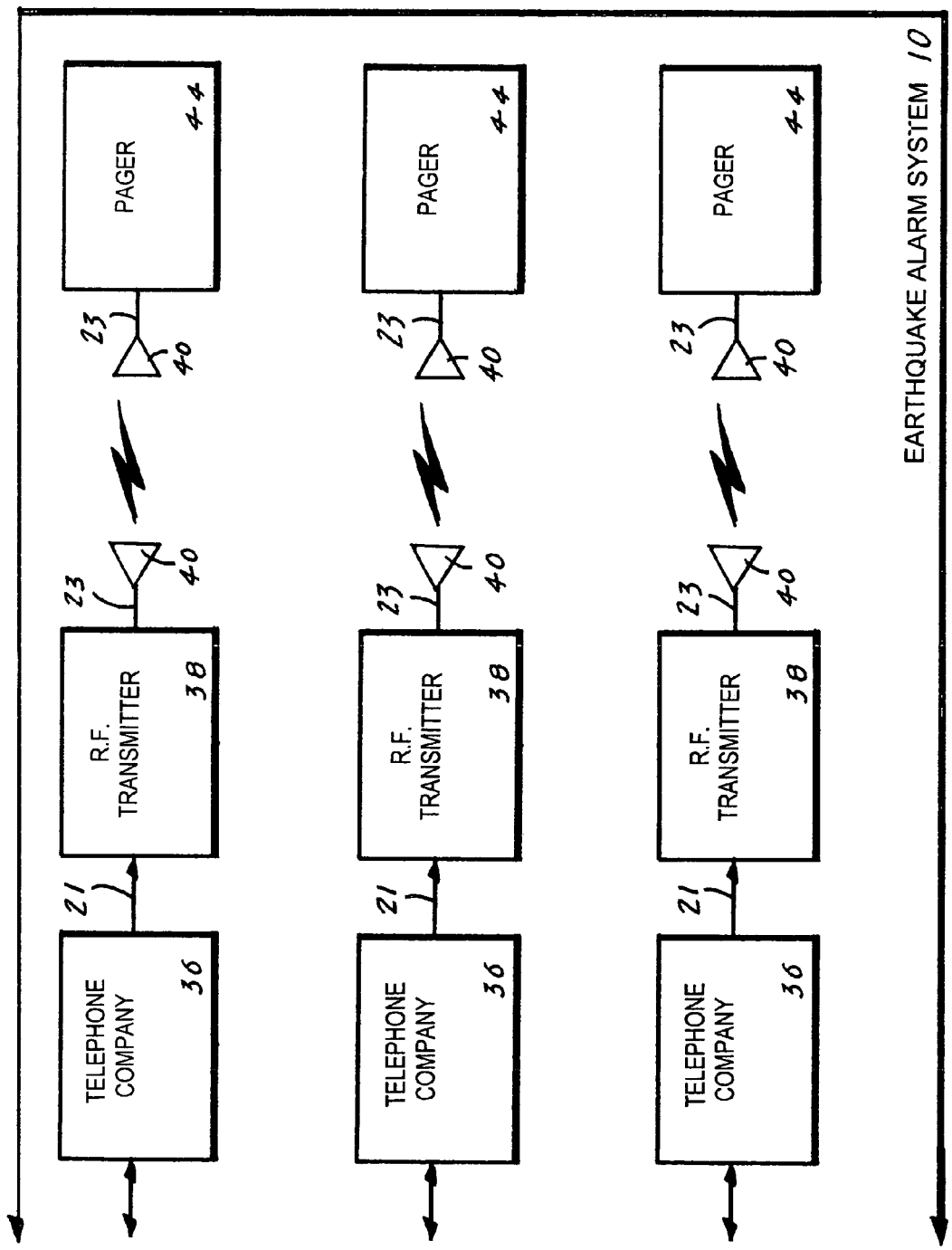

The preferred embodiment, as shown in FIGS. 1A, 1B, 2A, 2B and 3 is disclosed in two design configurations, the first design is shown in FIGS. 1A and 1B, and a modified design that includes three independent earthquake alarm systems 10, is shown in FIGS. 2A and 2B. In either design configuration, the earthquake alarm system 10 is comprised of eight major elements: a plurality of earthquake detecting devices 12, a microcontroller 26, an auto dialer 30, a telephone line receptacle 34, a telephone company 36, an R.F. transmitter 38, an R.F. antenna 40 and a plurality of wireless pagers 44.

The plurality of earthquake detecting devices 12 are each comprised of a plurality of earthquake sensing switches 14. Each switch 14 is calibrated to close at a pre-selected Richter scale magnitude, wherein each switch closure produces a seismic event signal 11 that corresponds to the Richter scale magnitude of the earthquake. The earthquake sensing switches 14 are preferably comprised of mercury switches 16 that are further comprised of:

A. A first mercury switch calibrated to close at a Richter scale magnitude ranging from 4.0 to 4.7, B. A second mercury switch calibrated to close at a Richter scale magnitude ranging from 4.7 to 5.7, and C. A third mercury switch calibrated to close at a Richter scale magnitude greater than 5.7.

The microcontroller 26, as shown in FIG. 1A, has means for continuously monitoring the seismic event signals 11 that are applied by the earthquake sensing switches 14. The microcontroller 26 also produces an auto dialer activating signal 13 and a subsequent earthquake magnitude signal 15. Preferably, the microcontroller 26 used in the system 10, is comprised of a MICROCHIP® PIC16C5X series microcontroller. This microcontroller 26 incorporates an EPROM/ROM-based 8-bit CMOS that allows direct, indirect and relative addressing modes for data and instructions. Thus, the microcontroller 26 can be easily and relatively quickly programmed. In lieu of the PIC16C5X series microcontroller a PARALLAX®BSI-1C Stamp 1 Module can be utilized.

The auto dialer 30 includes means for being activated upon the application of the auto dialer activating signal 13 that is applied from the microcontroller 26. The auto dialer 30 produces an earthquake alert signal 17 following the application of the earthquake magnitude signal 15. The auto dialer 30 is comprised of an industry standard auto dialer 30 that include means for automatically and quickly dialing selectable telephone numbers.

Both the microcontroller 26 and the auto dialer 30 each include a power source consisting of as rechargeable battery 56 that is connected to a battery charging unit 58, that is connected as shown in FIG. 1A. The battery charging unit 58, which is connected to a 120 volt a-c utility power line 27, maintains the rechargeable battery 56 at an optimum power level.

The earthquake alert signal 17 produced by the auto dialer 30 is applied to a standard telephone line receptacle 34 that routes the earthquake alert signal 17 via commercial telephone lines 19 to a telephone company 36. From the telephone company 36 is produced a transmitter activation signal 21 that is applied to the R.F. transmitter 38, as shown in FIG. 1B.

The R.F. transmitter 38 is preferably designed to operate at a frequency that is allocated by the Federal Communication Commission (FCC). When the R.F. transmitter 38 is activated by the transmitter activating signal 21 it produces an R.F. signal 23 that is applied via the R.F. antenna 40 into free space.

The R.F. signal 23, as shown in FIG. 1B, activates the remotely-located wireless pagers 44. The pager 44 includes a visual indicator and/or an optional audio device that are activated when an earthquake is imminent. The plurality of wireless pagers are each comprised of:

A. A yellow LED that indicates an earthquake with a Richter scale magnitude of 4.0 to 4.7, B. An orange LED that indicates an earthquake with a Richter scale magnitude of 4.7 to 5.7, C. A red LED that indicates an earthquake with a Richter scale magnitude greater than 5.7, and D. A white LED that indicates a low battery in said pager.

In the preferred implementation of the earthquake alarm system 10, the earthquake detecting device 12, which is comprised of at least three detectors, as shown in FIG. 1A the microcontroller 26 and the auto dialer 30 are integrated into a single Application Specific Integrated Circuit (ASIC). The ASIC provides the system 10 with a higher reliability and facilitates the implementation of the system 10 in the field.

Figure 3:
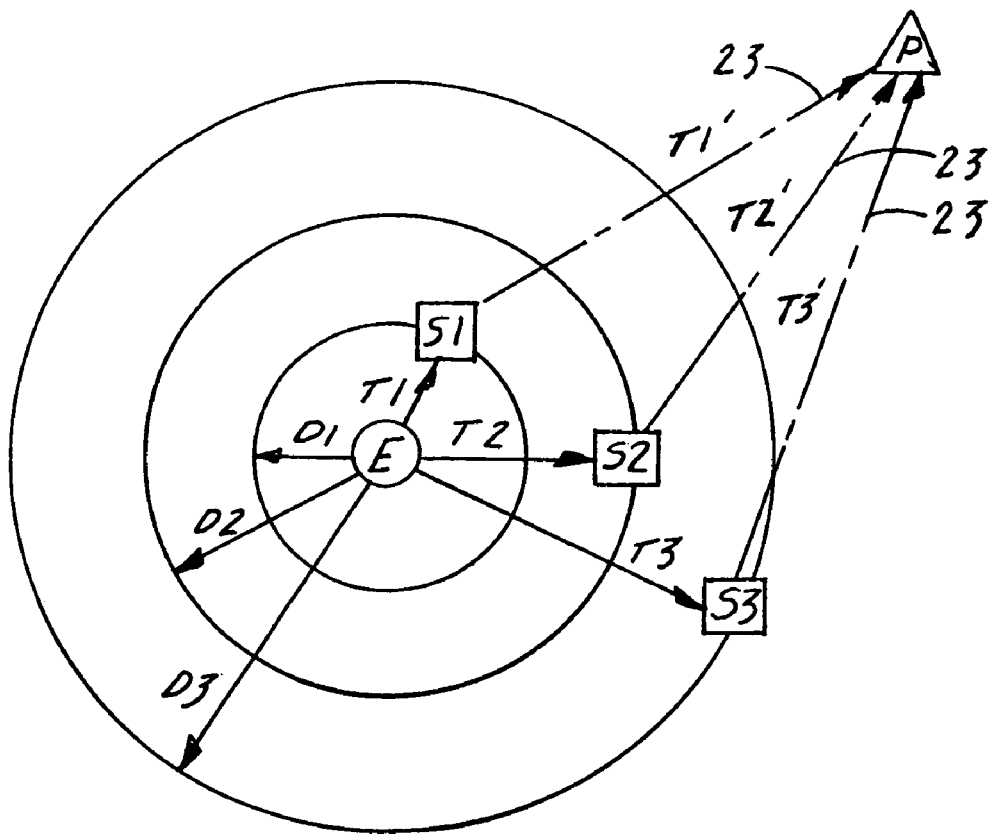
FIG. 3 is an illustration showing the relative locations of the earthquake alarm system, the epicenter of an earthquake and a remotely located pager.

The field implementation of the system 10, is shown in FIG. 3, wherein the earthquake epicenter is designated by the letter "E", the ASIC version of the system 10 is designated by the letter "S", the pager 44 is designated by the letter "P", time is designated by the letter "T" and distance by the letter "D".

When an earthquake occurs, shock waves emanate from the earthquake's epicenter E to the sensors S1, S2 and S3 which are located at a distance D1, D2 and D3 respectively. The sensors S1, S2 and S3 receive the shock wave in an amount of time T1, T2 and T3 respectively, depending on each sensor's distance from the epicenter. As a result of a plurality of sensors being utilized, it is anticipated that when an earthquake occurs there will be a sensor in relative proximity to the epicenter.

An earthquake's shock wave travels at approximately 0.5 miles/second, therefore the time T1 required for the sensor S1 closest to the epicenter E to receive the shock wave is negligible. From the sensor S1, the R.F. signal 23 is sent to each of the pager(s) represented by a single pager P in FIG. 3. The time T1' required for the signal to reach each pager P is determined by each pager's relative distance from the sensor S1.

As shown in FIG. 3, once the earthquake's shock wave reaches the sensors S2 and S3 that are further away from the epicenter EP, the sensors S2 and S3 also send the R.F. signal 23 to each of the pager(s) P. Again, the respective times T2' and T3' that are required for the signals to reach each pager P is determined by each pager's relative distance from the sensors S2 and S3.

The modified design of the earthquake alarm system 10, as shown in FIGS. 2A and 2B, is comprised of three independent earthquake alarm systems 10. Each of the independent systems 10 is comprised of the plurality of the earthquake detecting devices 12, the microcontroller 26, the telephone line receptacle 34, the telephone company 36, the R.F. transmitter 38, the R.F. antenna 40, the plurality of wireless pagers 44 and the battery charging unit 58. The function and description of the above system elements is identical to that described above.

While the invention has been described in detail and pictorially shown in the accompanying drawings it is not to be limited to such details, since many changes and modifications may be made to the invention without departing from the spirit and the scope thereof. Hence, it is described to cover any and all modifications and forms which may come within the language and scope of the claims.

The invention claimed is:

1. An earthquake alarm system comprising:
   a) at least one earthquake detecting device having means for producing a set of seismic event signals that each corresponds to the magnitude of the detected earthquake, wherein said earthquake detecting device comprises a plurality of earthquake sensing switches that are each calibrated to close at a pre-selected Richter scale magnitude, wherein each switch closure produces the seismic event signal that corresponds to the Richter scale magnitude of the detected earthquake,
   b) an electronics circuit having means for processing the seismic event signals and producing an R.F. signal that is applied into free space, and
   c) a plurality of remotely-located wireless pagers that are tuned to receive the R.F. signal and to subsequently activate an alarm indicating that an earthquake is imminent.

2. An earthquake alarm system comprising:
   a) at least one earthquake detecting device having means for producing a set of seismic event signals that each corresponds to the magnitude of the detected earthquake, wherein said earthquake detecting device comprises a plurality of earthquake sensing switches that are each calibrated to close at a pre-selected Richter scale magnitude, wherein each switch closure produces the seismic event signal that corresponds to the Richter scale magnitude of the detected earthquake, wherein said plurality of earthquake sensing switches are comprised of mercury switches consisting of:
   b) a first mercury switch calibrated to close at a Richter scale magnitude ranging from 4.0 to 4.7,
   c) a second mercury switch calibrated to close at a Richter scale magnitude ranging from 4.7 to 5.7, and
   d) a third mercury switch calibrated to close at a Richter scale magnitude greater than 5.7.

3. An earthquake alarm system comprising:
   a) at least one earthquake detecting device having means for producing a set of seismic event signals that each corresponds to the magnitude of the detected earthquake, wherein said earthquake detecting device comprises a plurality of earthquake sensing switches that are each calibrated to close at a pre-selected Richter scale magnitude, wherein each switch closure produces the seismic event signal that corresponds to the Richter scale magnitude of the detected earthquake, wherein said plurality of earthquake sensing switches are comprised of mercury switches consisting of:
      (1) a first mercury switch calibrated to close at a Richter scale magnitude ranging from 4.0 to 4.7,
      (2) a second mercury switch calibrated to close at a Richter scale magnitude ranging from 4.7 to 5.7, and
      (3) a third mercury switch calibrated to close at a Richter scale magnitude greater than 5.7,
   b) an electronics circuit having means % for processing the seismic event signals and producing an R.F. signal that is applied into free space, wherein said electronics circuit is further comprised of:
      (1) a microcontroller having means for continuously monitoring the seismic event signals produced by said mercury switches, and producing an auto dialer activating signal and an earthquake magnitude signal,
      (2) an auto dialer having means for being activated upon the application of the auto dialer activating signal, and producing an earthquake alert signal following the application of the earthquake magnitude signal,
      (3) a standard telephone line receptacle that routes the earthquake alert signal via commercial telephone lines to a telephone company, from where a transmitter activation signal is produced, and
      (4) an R.F. transmitter having means for being activated by the transmitter activation signal and producing the R.F. signal that is applied via an R.F. antenna into free space, and
   c) a plurality of remotely-located wireless pagers that are tuned to receive the R.F. signal and to subsequently activate an alarm indicating that an earthquake is imminent.

4. An earthquake alarm system comprising:
   a) at least one earthquake detecting device having means for producing a set of seismic event signals that each corresponds to the magnitude of the detected earthquake,
   b) an electronics circuit having means for processing the seismic event signals and producing an R.F. signal that is applied into free space, and
   c) a plurality of remotely-located wireless pagers that are tuned to receive the R.F. signal and to subsequently activate an alarm indicating that an earthquake is imminent, wherein said earthquake alarm is comprised of a visual alarm that can be operated in combination with an audio alarm, wherein the plurality of pagers each include said visual alarm that is further comprised of:
      (1) a yellow LED that indicates an earthquake with a Richter scale magnitude of 4.0 to 4.7,
      (2) an orange LED that indicates an earthquake with a Richter scale magnitude of 4.7 to 5.7,
      (3) a red LED that indicates an earthquake with a Richter scale magnitude greater than 5.7, and
      (4) a white LED that indicates a low battery in said pager.

5. An earthquake alarm system comprising:
   a) a plurality of earthquake detecting devices, wherein each device comprises a plurality of earthquake sensing switches that are each calibrated to close at a pre-selected Richter scale magnitude, wherein each switch closure produces a seismic event signal that corresponds to the Richter scale magnitude of the earthquake,
   b) a microcontroller having means for continuously monitoring the seismic event signals applied by said earthquake sensing switches, and producing an auto dialer activating signal and a subsequent earthquake magnitude signal,
   c) an auto dialer having means for being activated upon the application of the auto dialer activating signal, and producing an earthquake alert signal following the application of the earthquake magnitude signal,
   d) a standard telephone line receptacle that routes the earthquake alert signal via commercial telephone lines to a telephone company from where a transmitter activating signal is produced,
   e) an R.F. transmitter having means for being activated by the transmitter activating signal and producing an R.F. signal that is applied via an R.F. antenna into free space, and
   f) a plurality of remotely-located wireless pagers having means for being activated by the R.F. signal and subsequently activating a visual indicator and/or an audio device that indicate when an earthquake is imminent.

6. The earthquake alarm system as specified in claim 5 wherein said plurality of earthquake sensing switches are comprised of mercury switches.

7. The earthquake alarm system as specified in claim 6 wherein said plurality of mercury switches are comprised of
   a) a first mercury switch calibrated to close at a Richter scale magnitude ranging from 4.0 to 4.7,
   b) a second mercury switch calibrated to close at a Richter scale magnitude ranging from 4.7 to 5.7, and
   c) a third mercury switch calibrated to close at a Richter scale magnitude greater than 5.7.

8. The earthquake alarm system as specified in claim 5 wherein said microcontroller is comprised of a MICROCHIP® PIC16C5X chip that incorporates an EPROM/ROM-based 8-bit CMOS microcontroller series that allows direct, indirect and relative addressing modes for data and instructions.

9. The earthquake alarm system as specified in claim 5 wherein said auto dialer is comprised of an industry standard auto dialer having means for automatically dialing selectable telephone numbers.

10. The earthquake alarm system as specified in claim 5 wherein said R.F. transmitter operates at a frequency that is allocated by the FCC.

11. The earthquake alarm system as specified in claim 5 wherein said plurality of wireless pagers each comprise:
   a) a yellow LED that indicates an earthquake with a Richter scale magnitude of 4.0 to 4.7,
   b) an orange LED that indicates an earthquake with a Richter scale magnitude of 4.7 to 5.7,
   c) a red LED that indicates an earthquake with a Richter scale magnitude greater than 5.7, and
   d) a white LED that indicates a low battery in said pager.

12. The earthquake alarm system as specified in claim 5 wherein said microcontroller and said auto dialer each include a power source consisting of a rechargeable battery.

13. The earthquake alarm system as specified in claim 12 further comprising a battery charging unit connected to a utility power line, wherein said unit maintains said rechargeable battery in said microcontroller and said auto dialer at an optimum power level.

14. The earthquake alarm system as specified in claim 5 wherein said earthquake detecting devices, said microcontroller and said auto dialer are integrated into a single Application Specific Integrated Circuit (ASIC).

* * * * *